United States Patent
Leow et al.

(10) Patent No.: US 9,172,484 B2
(45) Date of Patent: Oct. 27, 2015

(54) BEACON FRAME

(75) Inventors: Siew Kiat Leow, Singapore (SG); Song Gee Lim, Singapore (SG); Zhaozhen Zeng, Putian (CN); Vincent Tong, Saratoga, CA (US)

(73) Assignee: Creative Technology Ltd, Singapore (SG)

( * ) Notice: Subject to any disclaimer, the term of this patent is extended or adjusted under 35 U.S.C. 154(b) by 653 days.

(21) Appl. No.: 12/783,486

(22) Filed: May 19, 2010

(65) Prior Publication Data

US 2010/0226300 A1    Sep. 9, 2010

Related U.S. Application Data

(62) Division of application No. 11/252,762, filed on Oct. 17, 2005, now Pat. No. 7,751,355.

(51) Int. Cl.
*H04L 12/28* (2006.01)
*H04J 3/06* (2006.01)
*H04W 56/00* (2009.01)

(52) U.S. Cl.
CPC .............. *H04J 3/0638* (2013.01); *H04W 56/00* (2013.01)

(58) Field of Classification Search
CPC ...... H04W 52/02; H04W 84/18; H04L 45/02; H04L 65/4084
USPC .............. 370/389, 350, 322, 311, 349, 395.4, 370/338; 455/343, 509; 709/221; 725/89
See application file for complete search history.

(56) References Cited

U.S. PATENT DOCUMENTS

| | | | |
|---|---|---|---|
| 7,912,033 B2* | 3/2011 | Heidari-Bateni et al. ..... | 370/350 |
| 7,979,516 B2* | 7/2011 | Dacosta ........................ | 709/221 |
| 8,045,494 B2* | 10/2011 | Habetha et al. ............... | 370/311 |
| 2002/0122410 A1* | 9/2002 | Kulikov et al. ............... | 370/349 |
| 2002/0132603 A1* | 9/2002 | Lindskog et al. ............. | 455/343 |
| 2005/0278758 A1* | 12/2005 | Bodlaender ...................... | 725/89 |
| 2006/0063543 A1* | 3/2006 | Matoba et al. ................ | 455/509 |
| 2006/0268891 A1* | 11/2006 | Heidari-Bateni et al. . | 370/395.4 |
| 2007/0053333 A1* | 3/2007 | Pragada ........................ | 370/338 |
| 2007/0274206 A1* | 11/2007 | Habetha et al. ............... | 370/222 |

OTHER PUBLICATIONS 802.11 Beacons Revealed by Jim Geier, Oct. 31, 2002.*

* cited by examiner

*Primary Examiner* — Dang Ton
*Assistant Examiner* — Lionel Preval
(74) *Attorney, Agent, or Firm* — Russell Swerdon; Desmund Gean

(57) ABSTRACT

A beacon frame (5) for transmission during a beacon period for a wireless device to maintain synchronization with other wireless devices of a community in a wireless communications network, the frame (5) comprising: a header (8) containing routing information for the frame (5); beacon parameters (9) to indicate signaling methods in use by the wireless devices; at least one information element (7) comprising at least one identifier to identify the wireless device; wherein the at least one identifier comprises a signature identifier (104) for the frame (5), an interface version, and a name and unique identifier for the device.

7 Claims, 7 Drawing Sheets

Figure 5 off-line searching

```
while(1) { wait(USER_ACTIVATION);

allocate_memory();

read_shareobject_from_harddisk();

create_dbase_from_shareobject();

while(1) { wait(USER_ACTIVATION || NEW_DEVICE);

if(NEW_DEVICE) {
                        identify_new_device(new_device);
                        download_shareobject(new_device);
                        add_new_device_content_to_dbase(new_deivce);
                } if(USER_ACTIVATION) get_input(user_action);
                else continue;

if(user_action.command==STOP) break;

else if(user_action.command==RECOMMAND) {
                        smart_play(user_style, selection);
                        display(selection);
                } else if(user_action.command!=DOWNLOAD) {
                        query_dbase(user_action, selection);
                        display(selection);
                } else {
                        download(selection);
                }

} stop_dbase();

release_memory();

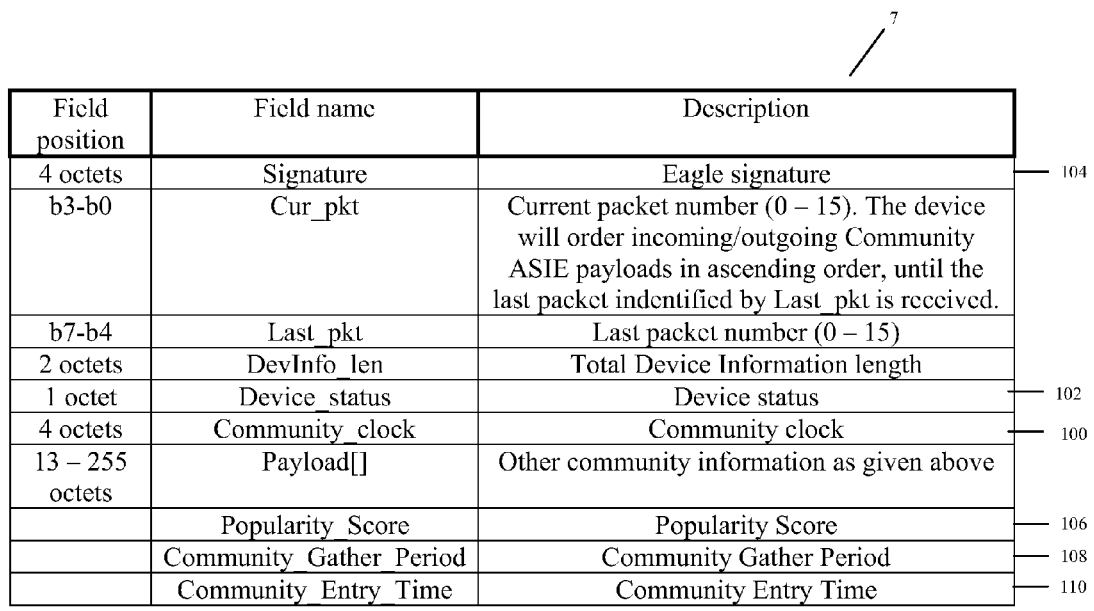

| Field position | Field name | Description |
| --- | --- | --- |
| 4 octets | Signature | Eagle signature |
| b3-b0 | Cur_pkt | Current packet number (0 – 15). The device will order incoming/outgoing Community ASIE payloads in ascending order, until the last packet indentified by Last_pkt is received. |
| b7-b4 | Last_pkt | Last packet number (0 – 15) |
| 2 octets | DevInfo_len | Total Device Information length |
| 1 octet | Device_status | Device status |
| 4 octets | Community_clock | Community clock |
| 13 – 255 octets | Payload[] | Other community information as given above |
| | Popularity_Score | Popularity Score |
| | Community_Gather_Period | Community Gather Period |
| | Community_Entry_Time | Community Entry Time |

BEACON FRAME

TECHNICAL FIELD

The invention concerns a beacon frame transmitted during a beacon period for a wireless device to maintain synchronization with other wireless devices of an ad hoc community in a wireless communications network.

BACKGROUND OF THE INVENTION

Portable media player shipments are expected to increase from less than 500,000 units in 2004 to more than 9 million units in 2009, according to a study by Semico Research Corp.

Audio, video and picture files may be played either on computers or digital entertainment systems. Music and media download services are easily available from websites such as, for example, Yahoo, Rhapsody, Soundbuzz and Napster. Portable media players extend the digital home by allowing consumers to play these media files while away from the home or office.

To share content wirelessly with multiple devices including portable media players, notebook and desktop computers and other electronic devices, MultiBand OFDM technology is used. This technology is currently undergoing standardization through the WiMedia Alliance.

There is a desire to reduce the power consumption of portable media players in order to extend the operational time of portable media players between battery recharges. In a wireless networking environment, there is also a desire to improve the response of a device when other devices are discovering its capabilities and the content it is willing to share with the other devices.

SUMMARY OF THE INVENTION

In a first preferred aspect, a beacon frame for transmission during a beacon period for a wireless device to maintain synchronization with other wireless devices of a community in a wireless communications network, the frame comprising:
  a header containing routing information for the frame;
  beacon parameters to indicate signaling methods in use by the wireless devices;
  at least one information element comprising at least one identifier to identify the wireless device;
  wherein the at least one identifier comprises a signature identifier for the frame, an interface version, and a name and unique identifier for the device.

The information element may further comprise:
(a) a shared object handler and date and time identifier to indicate the last update made to a shared object for indicating content available to the other wireless devices;
(b) a community identifier to identify the community;
(c) a popularity score to indicate the popularity of the wireless device and its priority in the community;
(d) a community clock to synchronise community activities;
(e) community gathering time period to detect the existence of the community and predetermined time intervals to join the community activities;
(f) device joint time community time indicator to indicate when the wireless device joined the community; and
(g) device status indicator to indicate whether the wireless device is active or passive.

The community may be ad hoc.

The header may be a Media Access Control (MAC) header.

The beacon parameters may include: a channel number that an access point is using, hopping pattern and dwell time.

The shared object may be part of a database to improve searching for content. The shared object may be part of a database to minimise redundancy of duplicated content.

The shared object may comprise: an object header, and variables relating to audio items, audio reference table, picture items, picture reference table, video items and video reference table.

In a second aspect, there is provided a method for forming a community in a wireless communications network to share information, the method comprising:
  transmitting a beacon frame to a plurality of wireless devices in the network; and at least one information element comprising at least one identifier to identify the wireless device;
  wherein the beacon frame comprises:
    a header containing routing information for the frame; and
    beacon parameters to indicate signaling methods in use by the wireless devices; and
  wherein the at least one identifier comprises a signature identifier for the frame, an interface version, and a name and unique identifier for the device.

The information element may comprise:
(a) a shared object handler and date and time identifier to indicate the last update made to a shared object for indicating content available to the other wireless devices;
(b) a community identifier to identify the community;
(c) a popularity score to indicate the popularity of the wireless device and its priority in the community;
(d) a community clock to synchronise community activities;
(e) community gathering time period to detect the existence of the community and predetermined time intervals to join the community activities;
(f) device joint time community time indicator to indicate when the wireless device joined the community; and
(g) device status indicator to indicate whether the wireless device is active or passive.

The community may be ad hoc.

In a third aspect, there is provided a method for saving power in a mobile device of a wireless network, the method comprising:
  checking whether a community of mobile devices is being created, and if not, deactivating a radio frequency transceiver of the mobile devices, otherwise, activating the radio frequency transceiver of the mobile devices and joining the community;
  wherein joining the community comprises:
    transmitting information related to the mobile device and receiving information related to other mobile devices in the community;
    synchronizing all mobile devices in the community to a community clock; and
    for each new mobile device in the community, requesting a list of available content that the new mobile device will share with the mobile devices in the community.

In a fourth aspect, there is provided a method for prioritizing access to content stored on a mobile device in a wireless network of mobile devices, the method comprising:

allocating a priority code to each mobile device;
checking for any new file transfer request from a third mobile device to a first mobile device while the first mobile device is in a first file transfer session with a second mobile device; and
determining whether the third mobile device has a higher priority than the second mobile device,
wherein if the third mobile device has a higher priority than the second mobile device, interrupting the first file transfer session and commencing a second file transfer session between the first and third mobile devices and after the second file transfer session is complete, the first file transfer session is resumed; and
wherein if the third mobile device has a lower priority than the second mobile device, continuing the first file transfer session between the first and second mobile devices, and after the first file transfer session is complete, commencing a second file transfer session between the first and third mobile devices.

BRIEF DESCRIPTION OF THE DRAWINGS

An example of the invention will now be described with reference to the accompanying drawings, in which:

FIG. 5 is pseudocode for performing off-line searching in accordance with a preferred embodiment of the present invention;

FIG. 7 is a table illustrating the structure of a payload portion of a community Application-Specific Information Element (ASIE) in accordance with a preferred embodiment of the present invention.

DETAILED DESCRIPTION OF THE DRAWINGS

Figure 1:
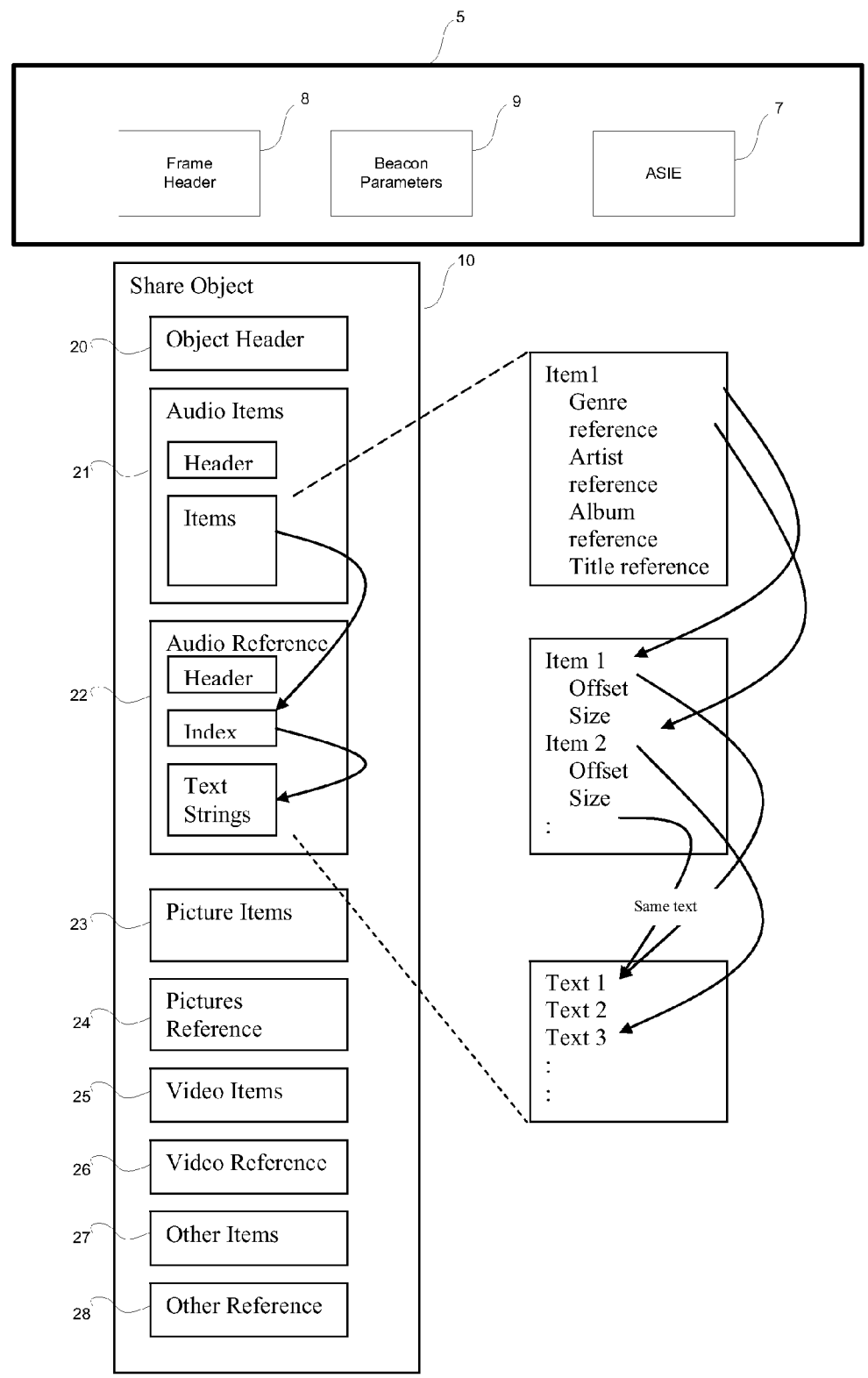
FIG. 1 is a schematic diagram of a shared object in accordance with a preferred embodiment of the present invention.

Referring to FIG. 1, there is provided a beacon frame 5 for transmission during a beacon period for a wireless device to maintain synchronization with other wireless devices of an ad hoc community in a wireless communications network. Wireless devices include devices which are enabled to communicate with other devices in a wireless manner, for example, MP3 players, mobile phones, hi-fi units, television, desktop/notebook computers, or handheld computers. The beacon frame 5 uses low network overhead and is easy and flexible to create. To form the community, the beacon frame 5 enables devices of a similar class to detect each other's existence. In one embodiment, the beacon frame 5 is compliant with Ultra Wideband (UWB)/MultiBand OFDM Alliance (MBOA). UWB/MBOA provides a loosely coupled network such that devices are able to join and leave without any additional substantial overhead on top of MBOA requirements. A device is able to go to sleep for an extended time to save power and wake up on at a predetermined time to meet and update other devices in the community. The frame 5 comprises: a header 8, beacon parameters 9 and at least one Application-Specific Information Element (ASIE) 7. The header 8 contains routing information for the frame. Beacon parameters 9 indicate signaling methods in use by the wireless devices.

Figure 3:
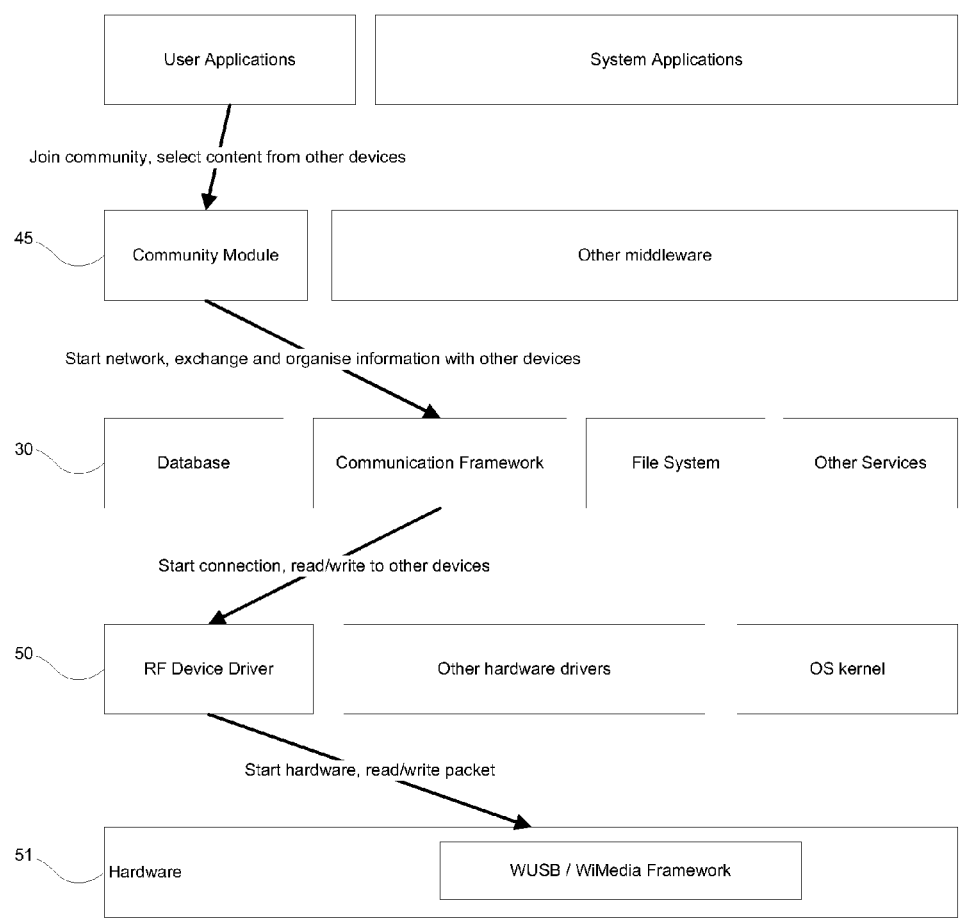
FIG. 3 is a high level design diagram of software components in the system architecture.

Turning to FIG. 3, in a typical wireless communications system various software and hardware components are present. In a first layer, there exists user applications and system applications. User applications perform specific functions and interact with the user. A user application interacts with a community module 45 in order to join a community and select content from other devices in the community. The community module 45 exists among other middleware modules. In turn, the community module 45 interfaces with the communication framework to start the ad hoc network, exchange and organize information with other devices in the community. At a lower layer, the communication framework interacts with an RF device driver 50 to start a connection and read/write to other devices in the community. The RF device driver 50 is responsible for interfacing with communications hardware 51 to initialize the hardware and read/write and broadcast communication packets such as a beacon frame 5.

FIG. 7 depicts an exemplary structure of a payload portion of a community ASIE 7. A device is required to send some information about itself to the community in a community ASIE 7. The ASIE 7 comprises: at least one identifier; a shared object handler and date and time identifier 10 (in FIG. 1); a community identifier; a popularity score 106; a community clock 100; community gathering time period 108; community entry time indicator 110; and a device status indicator 102. The at least one identifier identifies the wireless device. Identifiers include a signature 104 to indicate whether eagle peer-to-peer operation is supported, interface version to indicate which interface is supported, device name and unique identifier for the device. The unique identifier is designated by the manufacturer and cannot be changed by the user. The shared object handler and date and time identifier 10 indicates the last update made to a shared object for indicating content available to the other wireless devices. The shared object 10 enables local browsing on the device of content stored on other devices and thus reduces network traffic, power consumption and increase response time while browsing. The community identifier identifies the community. The popularity score 106 indicates the popularity of the wireless device and its priority in the community. The popularity score 106 is used in priority accessing of content, and indicates how active the device is in the community relative to other devices.

The community clock 100 synchronises community activities and the clock is numbered in terms of super frames since the start of the present community. The community clock 100 enables optimization of power consumption and response time. The community gathering time period 108 is used for detecting the existence of the community and predetermined time intervals to join the community activities. The community entry time indicator 110 indicates when the wireless device joined the community. This indicates seniority of a member for network optimization. When discrepancies in community clock 100 are found in the devices, the one with the higher number (the earlier one) wins and the others all adjust to the same value. The value for community entry time indicator 110 is adjusted by the same amount also.

The shared object 10 is preferably downloaded from more senior members to reduce network traffic. The shared object 10 is organized to improve searching of content and minimises redundancy of duplicated content within the community. This may also save memory/power usage on the device, and minimise the utilisation of network bandwidth. This consequently enhances network efficiency. The device status indicator 102 indicates whether the wireless device is active in all super frames or passive, that is, only participating in community gathering only.

Referring again to FIG. 1, the shared object 10 is part of a device database 30 to improve searching for content. The shared object 10 comprises: an object header 20, and variables relating to audio items 21, audio reference table 22, picture items 23, picture reference table 24, video items 25 and video reference table 26. Other content is also referenced by other items 27 and other items reference table 28. The shared object 10 is only transmitted when the device sends a request for it. As the shared object 10 is transmitted separately from the beacon frame 5, this means that all devices in the community are provided with a copy of each others shared object 10. Based on the assumption that content is not frequently changed, in particular, between beacon intervals, the shared object 10 is expected to be current. Thus, when one device is searching for content, it does not need to make a request over the network or connect with other devices but rather, only performs a local search on locally stored copies of the shared objects 10 of all the devices in the community it received during the previous beacon interval. This reduces overall network traffic, and power consumption of the devices since no transmission is required.

Figure 2:
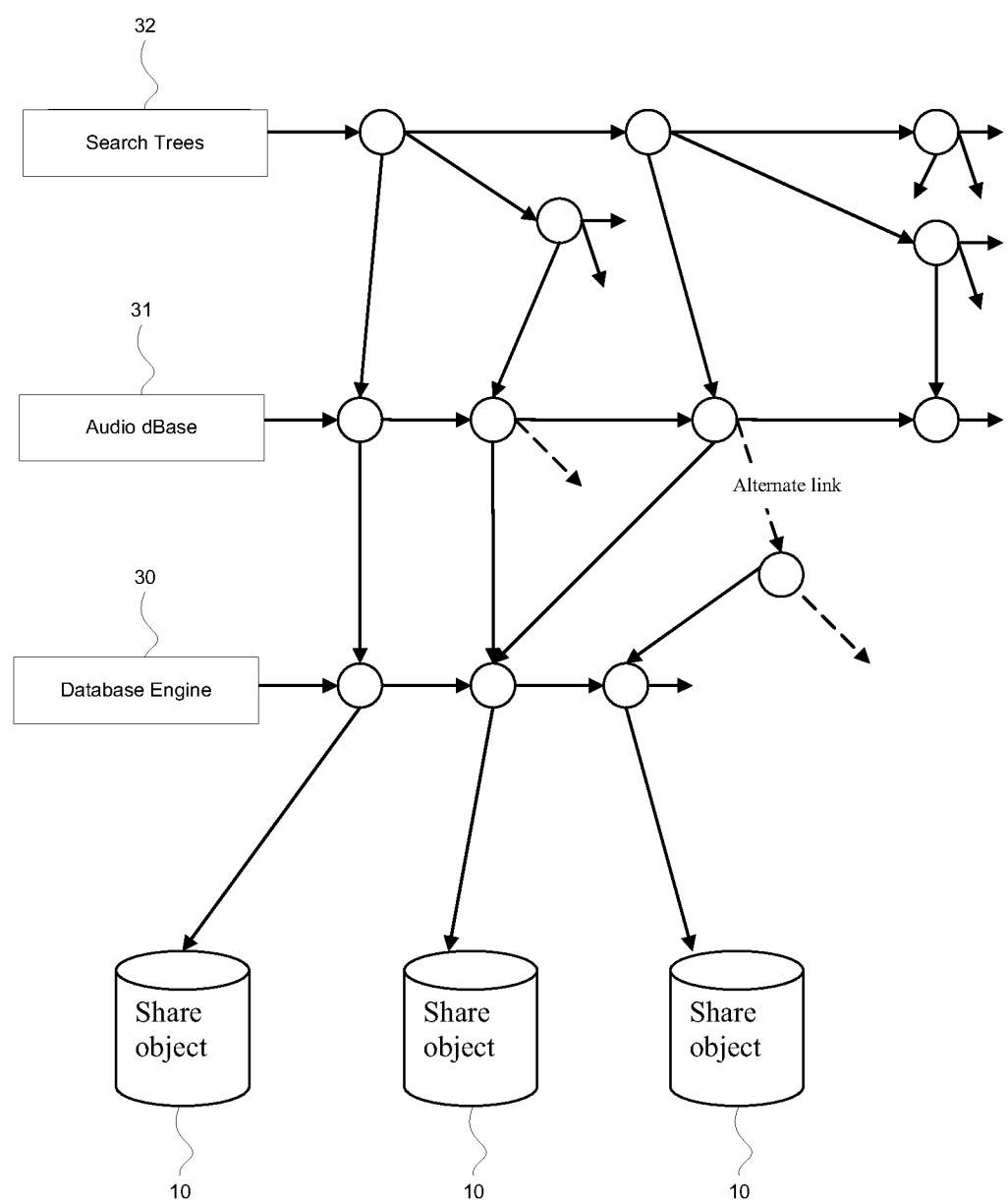
FIG. 2 is a schematic diagram of shared objects in a database.

Referring to FIG. 2, each device provides a Shared_object 10 indicating the content that it is prepared to share with other devices in the community. Another device in the community retrieves the Shared_object 10 from other devices in the community it detects and saves it in a special folder (root/community). The user is able to then browse through the available content without having to connect to other devices. As the time stamp of the Shared_object 10 is published in the Device Information information element of the ASIE 7, a device is able to check whether it has the latest Shared_object 10 from another device. In one embodiment, a limit may be placed on the number and size of Shared_objects 10 so that the memory required for the database 30 is bound.

In order to avoid having a new device connecting to all devices in the community to gather the Shared_object 10, the new device is able to request another member for the member listing and Shared_objects 10 of members of the community. It should be noted that this information might be incomplete or contain errors. However, this saves time, reduces network traffic and power consumption of the new device.

Referring to FIGS. 2 and 5, a device reads from the root/community folder for all the share objects from the devices detected in the community. The device initialises a database engine 30 to build the required search mechanism so that browsing is quick. Only Shared_object 10 from devices currently detected are used to build the search trees 32 and audio database 31. It is possible that the device with the desired content is non-connectable due to a number of reasons. Users are informed of the reason and necessary action is taken automatically. For example, if the device is not within transmission range any longer, content indicated by its Shared_object 10 is removed from the all binary trees 32, and so forth. It is possible that the Shared_object 10 of a device has been changed since the previous beacon interval. Users are able to thrash the current Shared_object 10 it has and retrieve a new copy from the device.

The search criteria/attributes supported include:
Audio file: Album, Title, Artiste, Genre
Photo: Album, Genre, Person
Video & Data file: Title, Genre, Artiste Based on the content and behaviour of the user, a user profile index may be inferred. This profile index may be published in the Community Information ASIE 7 that the entire community may see. The index is used to help users find a device with the most relevant content, or for a device to proactively push content to others.

When a user downloads an object/content, the browser retrieves the object information based on the handler from the Shared_object 10, confirm that it is indeed the correct one before actually downloading the full object. This is to prevent downloading of wrong objects due to changes in Shared_object 10. Each device may be limited to download content from only one other device at any one time for increased efficiency.

Access by other devices via peer-to-peer mode passes through a Store Manager for centralised control. Each device may support up to 16 groups of peer devices. Access rights to content is allocated on a group basis, that is, each item in the Shared_object has a 16-bit access flag indicating which groups are allowed to access it—one bit for each group (bit 0 to 15). Group 0 is a temporary group that consists of all current community members.

Objects not included in the Shared_object 10 are not accessible by other device. That is, it has been indicated as not being available and to be shared with others. Each device keeps a list for all members of its peer groups (groups 1-15), and a separate list for members of current community (group 0). Group 15 may be reserved for peer devices that are allowed to push content into the device.

Figure 4:
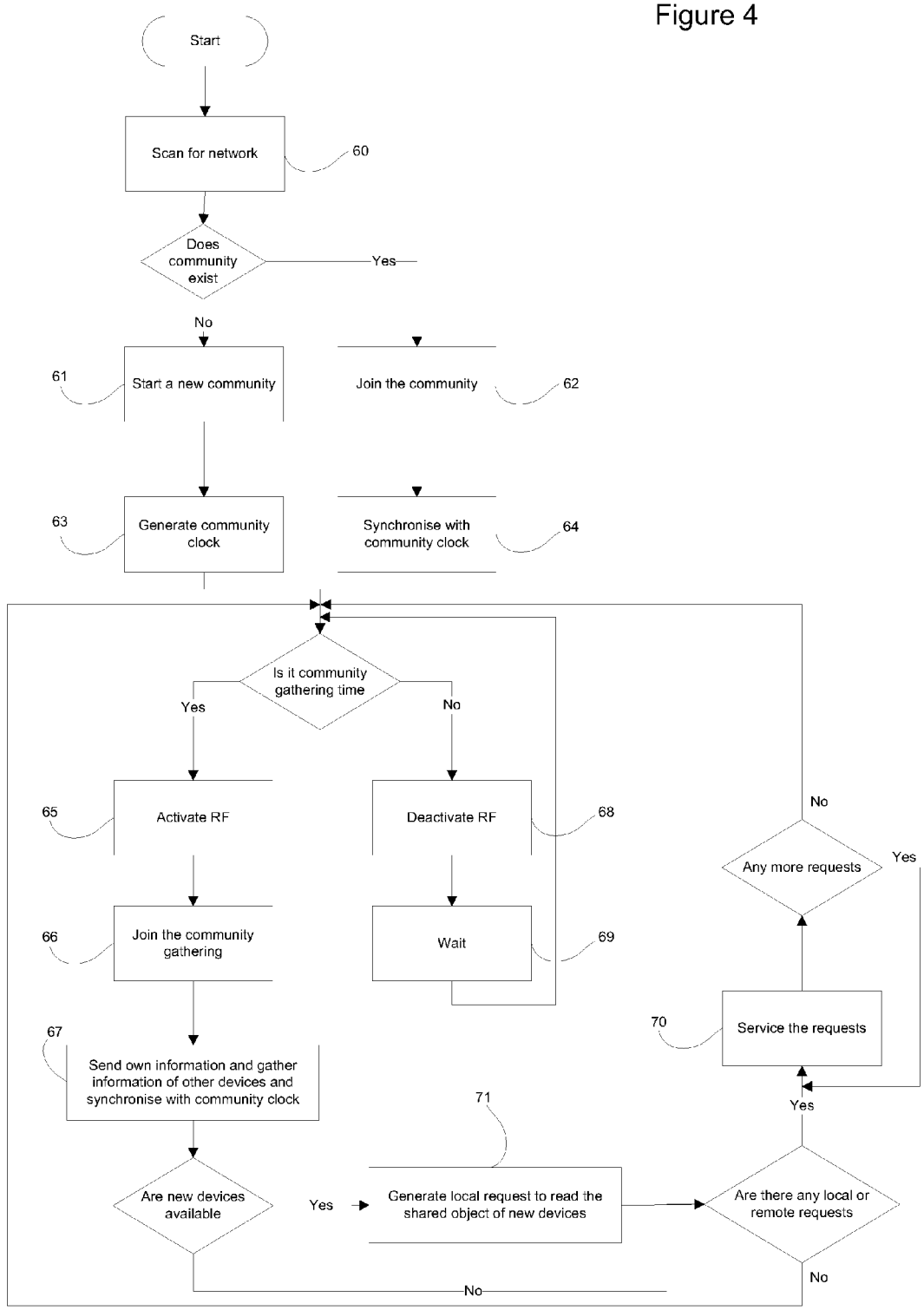
FIG. 4 is a process flow diagram of optimizing power consumption in accordance with a preferred embodiment of the present invention.

Referring to FIG. 4, to save power consumption of the device, the device performs a check of whether a community of mobile devices already exists 60. If no community exists, a new community is created 61 and the community clock 100 is generated 63. If one exists, the devices joins 62 the existing community and synchronises 64 with the community clock 100 of the existing community. If it is community gathering time, the radio frequency (RF) transceiver is activated 65. This activity consumes power. Next, the device 66 joins community gathering for synchronisation with other devices. The device sends 67 its own information to other devices in the community and gathers information from the other devices and synchronises with the community clock 100. A check to see whether any new devices are available in the community is performed. If there are new devices, a local request is generated 71 to read the shared object of the new devices. If there are no new devices, a check to determine whether any local or remote requests are to be performed. If there are requests, these requests are serviced 70. Additional requests are serviced until there are none further.

If it is not community gathering time, the RF transceiver of the device is deactivated 68 to conserve power consumption. The device waits 69 for a predetermined amount of time, and then repeats checking whether it is community gathering time.

Each device supports two simultaneous connections at one time. One dedicated for Multipurpose Transaction Protocol (MTP) class of command and one for the rest. The MTP commands which are supported are those for pull and push operations. The Remote UI commands supported are Send_IR_command to emulate IR Remote commands; Get_display_info to get the display characteristics of another device; and Send_display to send a screen shot over to another device.

Some examples of Community Operation Commands supported are: Get_Shared_object to retrieve the share object for another device; Offer object to send object information to another device and to initiate a MTP transfer after the recipient has signal its acceptance; Make friend to request to be registered with another device as member of one of its peer group, which in turn provides a reply with peer group name and access right; Check friendship to check whether a device is in the peer group of another device, which in turn provides a reply with the group names and access right; Get_group_list to retrieve the list of member in a peer group from another device; Broadcast_message to send a message to everyone in the community; and Send_message to send a message to another member of the community Referring to FIG. 4, the community is an open system which means anyone is able to join and leave any existing community at their leisure. In a typical scenario, when a device wants to join a community, it must scan for the existence of a community for at least COMMUNITY_WATCH_TIME. Once a community is found, the device may join the community and synchronise with the existing Community_Clock. A device in a community connects for a Beacon Slot and issues a Community Information Application-Specific Information Element (ASIE) 7 in its Beacon Slot. The device uses a mechanism provided by the underlying network layer to reserve its beacon slot during the inactive periods between community gatherings. The ASIE 7 is part of the beacon frame 5. The beacon frame 5 is a type of management frame which provides the heartbeat of a wireless network, enabling stations to establish and maintain communications in an orderly fashion. Beacon frames 5 announce the existence of the network, and enable stations to establish and maintain communications in an orderly fashion.

A device is able to start a new community by issuing the Community Information ASIE 7 with a new Community Name. The Community_Clock for a new community starts from zero. A community may be considered as new even if the same community, that is, with the same name, existed before but has disappeared after some time.

When Community_Clock=N*COMMUNITY_GATHER_PERIOD; (this is referred to as Community_Gathering) all member devices in the same community are active.

Community_Gathering provides a formal occasion for members to communicate with each other. However, this does not prevent members from contacting each other at other times. As long as both members are active and beaconing, they may establish a communication link with each other through the MBOA MAC protocol. In MBOA MAC protocol specification, a MBOA device may be allocated a beacon slot of maximum mMaxBeaconLength, which is 85 us–10 us–12 us, giving 63 us. The beacon 5 is transmitted at pBeaconTxRate (53.3 Mbps). At this rate a beacon frame 5 can send maximum of 63*53.3 bits per us, giving about 419 octets. A beacon frame 5 comprises of a MAC header 8 (10 octets), Beacon Parameters 9 (10 octets) and Information Elements 7.

For the community function, the ASIE 7 is used to transmit device information to all community members. Depending on which Information Elements (IEs) 7 are to be transmitted within the current Beacon 5, the ASIE 7 payload size will probably not be enough to convey the entire device information. In this case, the device information will be broken up into smaller parcels (in ASIE 7) to be sent over a few super frames. The ASIE 7 data length ranges from 0-255 octets.

The number of members to be supported is limited by the availability of beacon slots (maximum is 20×3=60). To avoid network failure, a device should not attempt to join the network when beacon slots are over 80% full.

The possible settings for the community gathering time period 108 and other community timings are:
  COMMUNITY_GATHER_PERIOD=64 (~4.2 sec)
  COMMUNITY_WATCH_TIME=15 sec
  COMMUNITY_WAKE_COUNT=2 (~130 msec)
  COMMUNITY_GATHER_LEN=3 (~200 msec)

With such settings, it takes up to 4.2 seconds to detect the existence of a community, up to 200 msec for community gathering and so forth.

A device may keep the information of a community it has participated to be used again next time when returning to the same community. This allows transmitted data to be re-used and reduces the network traffic also.

UWB connectivity application may be provided for each device. This application provides two UWB operation modes: Wireless-USB (WUSB) Media Transfer mode and Network mode. WUSB Media Transfer mode enables the device to connect to any standard WUSB host. This provides the capability of transferring media files between the host and the device. The device has a WUSB Native Device protocol stack. This enables the device to communicate with any PC equipped with either a WUSB Host embedded module or with a WUSB Host Wired Adapter (HWA) dongle/external card. Examples of the device may be Creative Technology's Portable Media Centre™ or the Zen Vision™.

The device networking mode is based on a TCP/IP networking which interfaces directly to the MBOA MAC standard protocol. It enables multiple devices to establish and ad-hoc network and share media files. Typically, to establish fast and simple connectivity between a personal computer and the device, the media is either downloaded from the PC to the device or from the device back to the PC storage media.

Figure 6:
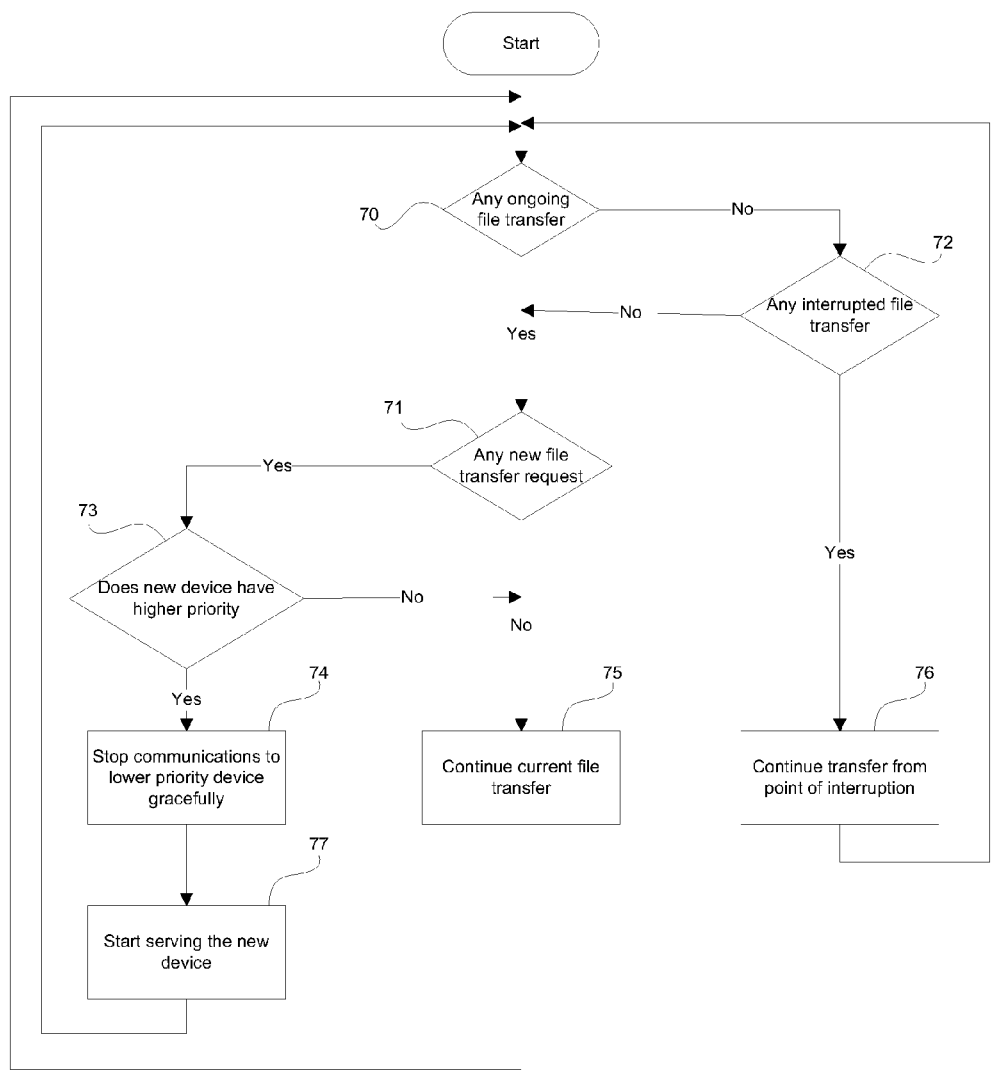
FIG. 6 is a process flow diagram of prioritizing access to content in accordance with a preferred embodiment of the present invention.

Referring to FIG. 6, a mechanism to implement priority in accessing content based on level of participation by the device is provided. Each device has a popularity score, calculated based on the amount of content other has downloaded from him with decay over time. When device A wants to pull content from device B, which is already engaged with device C, a check 70 is made to determine if there is any ongoing file transfer. If there is an ongoing file transfer, a check 71 is made to determine if there have been any new file transfer requests. If there is a new request, a check 73 is made to determine whether device A has a higher priority than device C. If it does, communications is stopped 74 between devices B and C and device A is served 77. If it does not, the current file transfer between devices B and C continues 75. Also, if there are no new file transfer requests, the current file transfer between devices B and C continues 75.

If there the check 70 determines there is no ongoing file transfer, a check 72 to determine if there was any previously interrupted file transfer is made. If so, the interrupted transfer is recommenced 76 from the point of interruption. When a device is interrupted by a more popular device, it remembers where the downloading stops and preserves the content already downloaded. It starts downloading again at the next opportunity and starting at where it stopped. Users may be prompted when interruption occurs.

Whenever there is a successful download by other devices from the device, the popularity score 106 may be updated by:
  Popularity_score=old_score+ transfer_size*SIZE_FACTOR+COUNT_FACTOR Alternatively, the popularity score 106 may be updated by:
  Popularity_score=old_score*DECAY_FACTOR_1/DECAY_FACTOR_2

In the instance when a user chooses to reject a download request from others, the popularity score 106 may be updated by:
  Popularity_score=old_score*REJECT_FACTOR_1/REJECT_FACTOR_2

Each device must store and calculate the popularity_score 106 in an organised manner to ensure proper operation of the system. As describer earlier, the popularity score 106 is included in the Community ASIE 7.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A method for saving power in a mobile device of a wireless ad hoc network community, the method comprising:
    (a) providing a beacon frame for transmission by each member of a community of mobile devices during a beacon period, the beacon frame associable with a community time period, a community entry time indicator and a community clock, the community entry time indicator indicating when the member joined the community;
    (b) detecting the existence of the community of mobile devices using the community time period;
    (c) determining the member with the highest seniority among the community of mobile devices by comparing the community entry time indicator of the members;
    (d) synchronizing with the community clock of the member with the highest seniority; and
    (e) using the community time period to determine whether or not the community is in community gathering time,
        if the community is not in community gathering time, deactivating a radio frequency transceiver of the mobile device, and
        if the community is in community gathering time, activating the radio frequency transceiver of the mobile device.

2. The method according to claim 1, wherein after deactivating the radio frequency transceiver, a predetermined amount of time passes before re-checking whether a community of mobile devices is being created.

3. The method according to claim 1, wherein the community gathering time includes determining predetermined time intervals to join the community activities.

4. The method according to claim 1, wherein if the community is in community gathering time:
    joining the community gathering for synchronization with other members in the community,
    transmitting information related to the mobile device to other members in the community,
    receiving information related to other members in the community, and
    determining whether there are new members in the community,
    wherein for each new member determined in the community, a list of available content that the new member will share with the members in the community is requested.

5. The method according to claim 1, wherein the community gathering time is for a predetermined period of time and that the radio frequency transceiver of the mobile device remains activated during this predetermined period of time.

6. The method according to claim 1, wherein if the community is in community gathering time:
    joining the community gathering for synchronization with other members in the community, and at least one of:
        transmitting information related to the mobile device to other members in the community; and
        receiving information related to other members in the community,
    wherein the information is associable with a shared object which enables local browsing to reduce power consumption while browsing.

7. The method according to claim 1 further comprising downloading a shared object, the shared object being part of a device database,
    wherein the downloaded shared object enables local browsing to reduce power consumption while browsing when the community is not in community gathering time.

* * * * *